United States Patent
Korneluk et al.

(10) Patent No.: US 7,164,930 B2
(45) Date of Patent: Jan. 16, 2007

(54) SWITCHING A CALL FROM A NETWORK ASSISTED COMMUNICATION MODE TO A DIRECT COMMUNICATION MODE

(75) Inventors: Jose E. Korneluk, Boynton Beach, FL (US); Sherry Easter Dubin, Coconut Creek, FL (US); Swetal A. Patel, Plantation, FL (US); Anthony Rodrigues, Lighthouse Point, FL (US); James T. Walsh, Parkland, FL (US)

(73) Assignee: Motorola, Inc., Schaumburg, IL (US)

( * ) Notice: Subject to any disclaimer, the term of this patent is extended or adjusted under 35 U.S.C. 154(b) by 62 days.

(21) Appl. No.: 11/026,751

(22) Filed: Dec. 31, 2004

(65) Prior Publication Data
US 2006/0148502 A1   Jul. 6, 2006

(51) Int. Cl.
*H04Q 7/20* (2006.01)
(52) U.S. Cl. .............. 455/518; 455/41.2; 455/456.1; 455/421
(58) Field of Classification Search .. 455/456.1–456.6, 455/41.2, 41.3, 552.1, 553.1, 517–519, 426.1, 455/421, 445, 440; 370/328, 338, 465
See application file for complete search history.

(56) References Cited

U.S. PATENT DOCUMENTS

| | | | |
|---|---|---|---|
| 5,423,055 A | | 6/1995 | Diaz et al. |
| 5,666,661 A | * | 9/1997 | Grube et al. ............ 455/517 X |
| 5,983,099 A | * | 11/1999 | Yao et al. ................ 455/426.1 |
| 6,226,524 B1 | | 5/2001 | Allen et al. |
| 2003/0013471 A1 | | 1/2003 | Vilmur et al. |
| 2004/0110531 A1 | * | 6/2004 | Sanchez .................. 455/553.1 |

* cited by examiner

*Primary Examiner*—Matthew D. Anderson
*Assistant Examiner*—Philip J. Sobutka
(74) *Attorney, Agent, or Firm*—Scott M. Garrett (57) ABSTRACT

A mobile communication device (214) in a communication system (200) initiates a call over the fixed equipment network of the communication system to another mobile communication device (216). If the two mobile communication devices are within sufficient proximity to each other, they may switch to a direct mode of communication. (318). The direct mode and network mode of communication are in different frequency bands using different air interface protocols.

13 Claims, 6 Drawing Sheets

SWITCHING A CALL FROM A NETWORK ASSISTED COMMUNICATION MODE TO A DIRECT COMMUNICATION MODE

TECHNICAL FIELD

This invention relates in general to wireless mobile communications, and more particularly communications devices which are capable of communicating with other communication devices both directly and via a communications network.

BACKGROUND OF THE INVENTION

Mobile and personal communications are ubiquitous in metropolitan regions of the world, and many people have come to depend on these systems. Frequency reuse systems like cellular telephony are among the most popular and well known systems. In these systems communications at a distance is facilitated by the use of a fixed equipment network of radio transceivers, switches, routers, gateways, and so on. These systems support communication for subscribers of the systems, and subscribers generally pay for access to the communication service. When a subscriber initiates a call the fixed equipment network sets up a call circuit between the subscriber and the party the subscriber is calling. If the subscriber is calling another subscriber nearby, the call is still routed through the fixed equipment network even though the two parties are within a short range of each other. In metropolitan regions subscriber to nearby subscriber traffic may account for a substantial proportion of the calls handled by the infrastructure network. Similarly, certain events with large numbers of people, such as sporting events, may generate a significant amount of subscriber to nearby subscriber traffic. Many communication service operators market their service by allowing subscribers to call other subscribers of the service without incurring additional charges. In cells where there is a substantial amount of subscriber to nearby subscriber traffic, it would be desirable for the system to shed these calls to ensure sufficient capacity for calls that do generate revenue. Furthermore, it may be desired by the subscribers to avoid using the infrastructure to call nearby parties, regardless of whether they subscribe to the same communication service.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

The invention provides for a means by which users of mobile communication devices may directly call each other without use of a communication infrastructure network. The invention provides calls in progress to be automatically switched from a network-facilitated call to a direct, mobile communication device to mobile communication device calling mode if the parties are within sufficient range of each other. The switching may be system initiated or user initiated. The invention provides a number of means for determining the proximity of subscribers, such as, for example, comparing locations of the mobile communication devices as determined by on-board satellite positioning receivers, or comparing timing advance numbers within a common serving cell.

Figure 1:
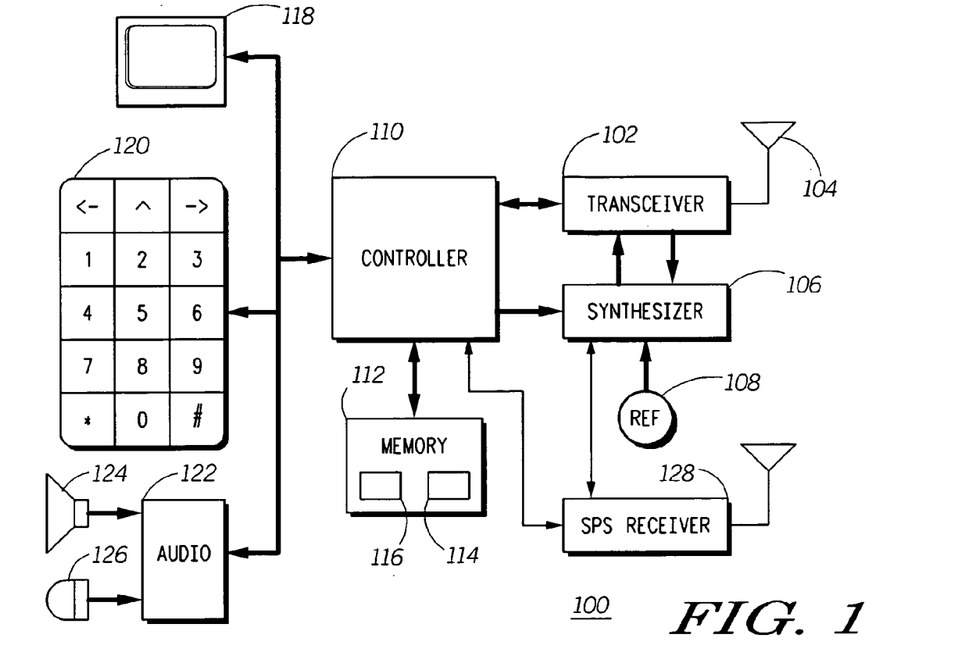
FIG. 1 shows a block schematic diagram of a mobile communication device, in accordance with an embodiment of the invention.

Referring now to FIG. 1, there is shown a block schematic diagram of a mobile communication device 100, in accordance with an embodiment of the invention. The mobile communication device includes a tunable transceiver 102 for performing various radio operations which may include modulating, demodulating, amplifying, spreading, timing, and so on. The transceiver is coupled to an antenna 104 for transmitting and receiving signals over an air interface, and is operable over a range of frequency bands, and is responsive to a frequency synthesizer 106, which generates operating frequencies for tuning the transceiver's transmit and receive circuits. The synthesizer generates operating frequencies from a reference oscillator 108, and is responsive to tuning information received from a controller 110 and error feedback received from the transceiver.

The controller 110 controls operation of the mobile communication device, and the various components and subsystems of the mobile communication device. The controller is coupled to a memory 112 which may be a composite memory including several different forms of memory such as read only memory, non-volatile rewritable memory, flash memory and so on. Several different types of memory are typically used in mobile communication devices. The memory contains instruction code for performing various tasks, applications, interfaces, and data structures. In accordance with the invention the memory contains at a first code module set 114 for performing network facilitated calling in a first frequency band in accordance with a first wireless communication protocol, and a second code module set 116 for performing direct calling in a second frequency band according to a second wireless communication protocol. The first and second code module sets include instruction code, tuning and other radio parameters for initiating, receiving, and switching calls in each of the first and second wireless communication protocols. The memory may also contain instruction code for automatically switching from one mode to the other, including determining whether a called or calling party is within range of a direct communications calling mode. The memory also contains instruction code for establishing a user interface with user interface components such as a display 118, including a display driver, a keyboard 120 and keyboard driver, and an audio subsystem 122 for performing digital to analog and analog to digital conversion of signals sent to a speaker 124 and microphone 126, respectively, and amplification.

In one embodiment of the invention the mobile communication device also includes a satellite positioning receiver 128 for receiving positioning signals from satellites, such as global positioning satellites (GPS), for example. The satellite positioning receiver may determine the location of the mobile communication device autonomously, or the mobile communication device may receive aiding information from another source, such as the fixed equipment network. Aiding information may include, for example, approximate position, ephemeris data, Doppler data, and so on. The satellite positioning receiver may use the synthesizer 106 as a clock source, or it may contain further clock generation circuits, or it may contain its own frequency generation and reference oscillator circuits.

Figure 2:
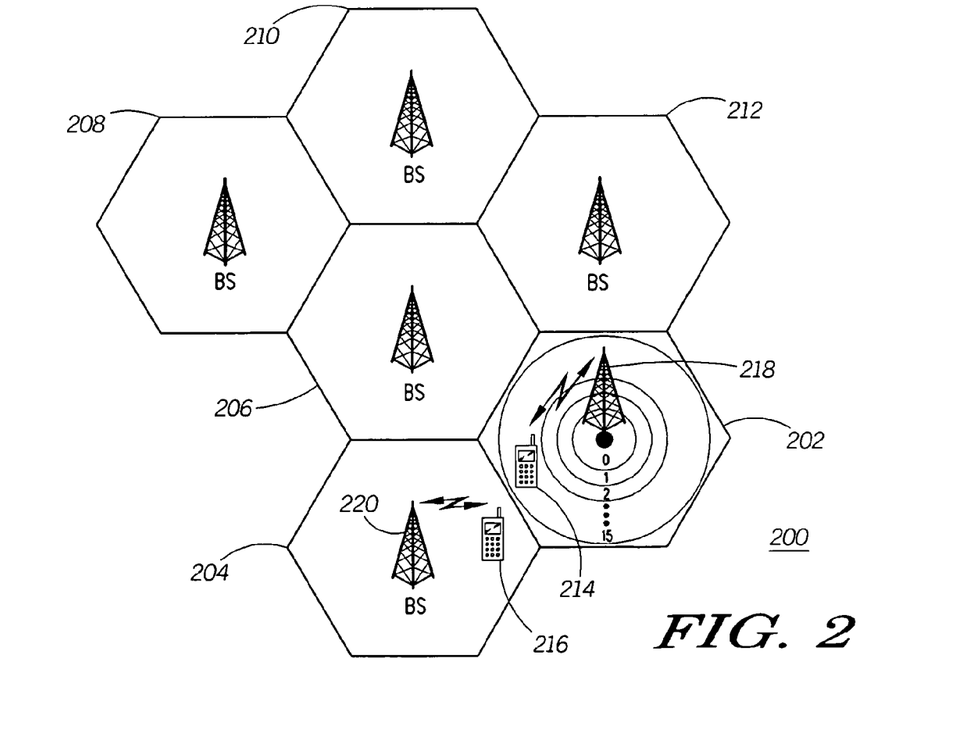
FIG. 2 shows a system diagram of a portion of a cellular communication system, in accordance with an embodiment of the invention.

Referring now to FIG. 2, there is shown a system diagram of a portion of a cellular communication system 200, in accordance with an embodiment of the invention. The system includes a plurality of cells, comprised of serving areas 202, 204, 206, 208, 210, and 212. Each serving area includes a base station, which includes a radio transceiver for providing communication service to mobile communication devices in the vicinity of the base station, in accordance with an air interface prescribed by a wireless communication protocol. Mobile communication devices in the serving cells, such as mobile communication devices 214, 216, communicate with the respective serving base station to facilitate communications. In time division systems, where mobile stations are assigned channels defined, in part, by time slots of repeating frames, timing is a critical aspect of both transmitting and receiving signals. To ensure sufficiently precise timing, time advance settings or bands 218 are defined which correspond to the distance from the base station transceiver. The time advance index is used to adjust timing so that signals transmitted by the mobile communication device arrive at the base station at the right. The time advance index is determined as a function of the distance, or effective radio path distance from the base station. The time advance index and neighbor cell signal strength of mobile communication devices in the same serving cell may be compared to determine if the mobile communication devices are sufficiently close to switch from network assisted communication to direct communication, if desired by the users, or necessitated by the network.

Figure 3:
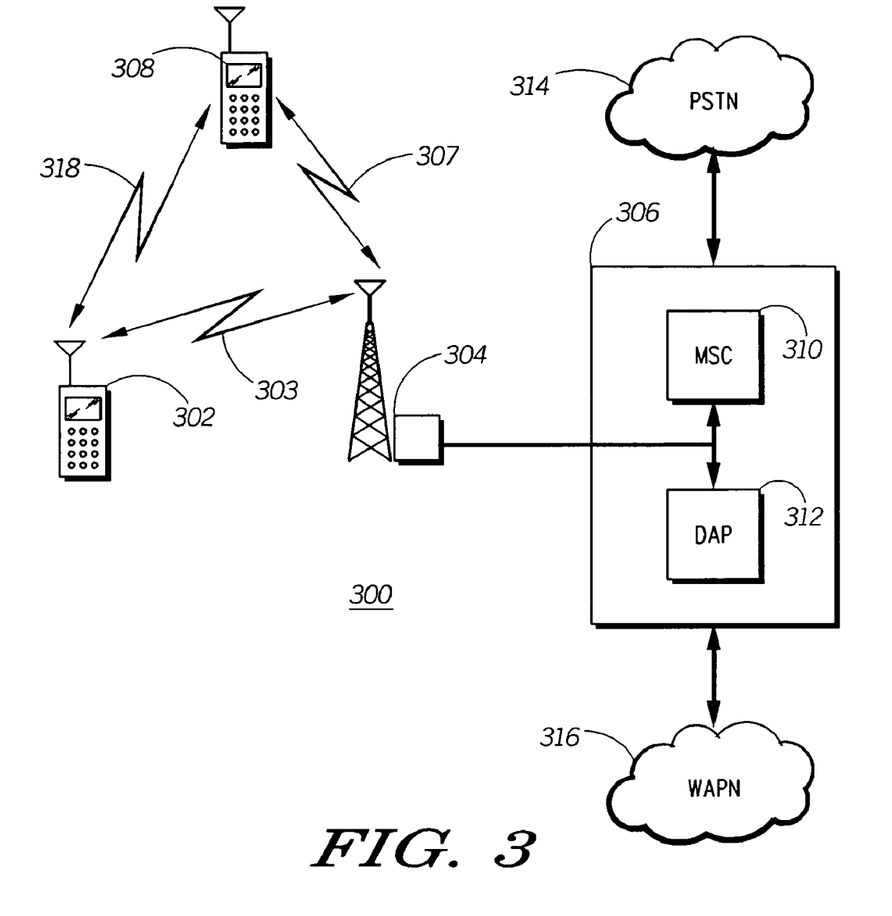
FIG. 3 shows a block diagram of a communication system for facilitating both network assisted communication and direct communication among mobile communication devices, in accordance with an embodiment of the invention.

Referring now to FIG. 3, there is a shown a block diagram of a communication system 300 for facilitating both network assisted communication and direct communication among mobile communication devices, in accordance with an embodiment of the invention. A first mobile communication device 302 is in the serving cell of a base station 304, and communicates with the base station over an air interface 303. The base station is part of a fixed equipment network which may include a central office 306. To communicate with a second mobile communication device 308, the first mobile communication device initiates a call to the second mobile communication device through the central office. If the call is a telephony call, the call is routed through a mobile switching center 310. If the call is a dispatch call, the call is routed through a dispatch application processor 312. By dispatch it is meant a simplex calling mode where one party speaks while the other listens, and typically the receiving mobile communication device play the received audio signal over a loud speaker instead of an earpiece so that the user can hear the audio signal without having to hold the mobile communication device to the ear of the user. The central office also typically provides connectivity to a public switched telephone network 314 and a wide area packet network 316, such as the Internet. The second mobile communication device communicates with base station over a similar air interface 307, and may be alerted to the incoming call, for example, over a paging channel, as is well known. Upon establishing a call through the network, it may be determined that the first and second mobile communication devices are sufficiently close that the call may be further commenced over a direct channel 318. The direct channel is established according to a direct calling mode which uses a different frequency band and communication protocol than is used by the mobile communication devices to communicate with the base station 304.

In one embodiment of the invention the direct calling mode is performed in the industrial, scientific, and medical (ISM) frequency band defined by the International Telecommunications Union as bands reserved internationally for non-commercial use of RF electromagnetic fields for industrial, scientific and medical purposes, but in recent years they have also been used for license-free error-tolerant communications applications. ISM bands have been defined in the 900 MHz, 2.4 GHz, and 5.8 GHz regions of the radio spectrum. An ISM band is an unlicensed band, meaning no license is required to use the band so long as certain restrictions are observed. An example of a direct calling mode may be found in published U.S. patent application 20040152479, which was published on Aug. 5, 2004, and titled "Data channel procedure for systems employing frequency diversity." The direct mode communication described therein is one employing a frequency diverse and frequency hopped asynchronous communication mode.

In one embodiment of the invention, the network assisted and direct calling modes are performed with the same transceiver of the mobile communication device. That is, the same transmitter, receiver, and frequency synthesizer are used for both modes, for both bands and wireless communication protocols. By using the same transceiver for both modes, cost and size of the mobile communication device, both being critical marketing features, may be minimized.

Figure 4:
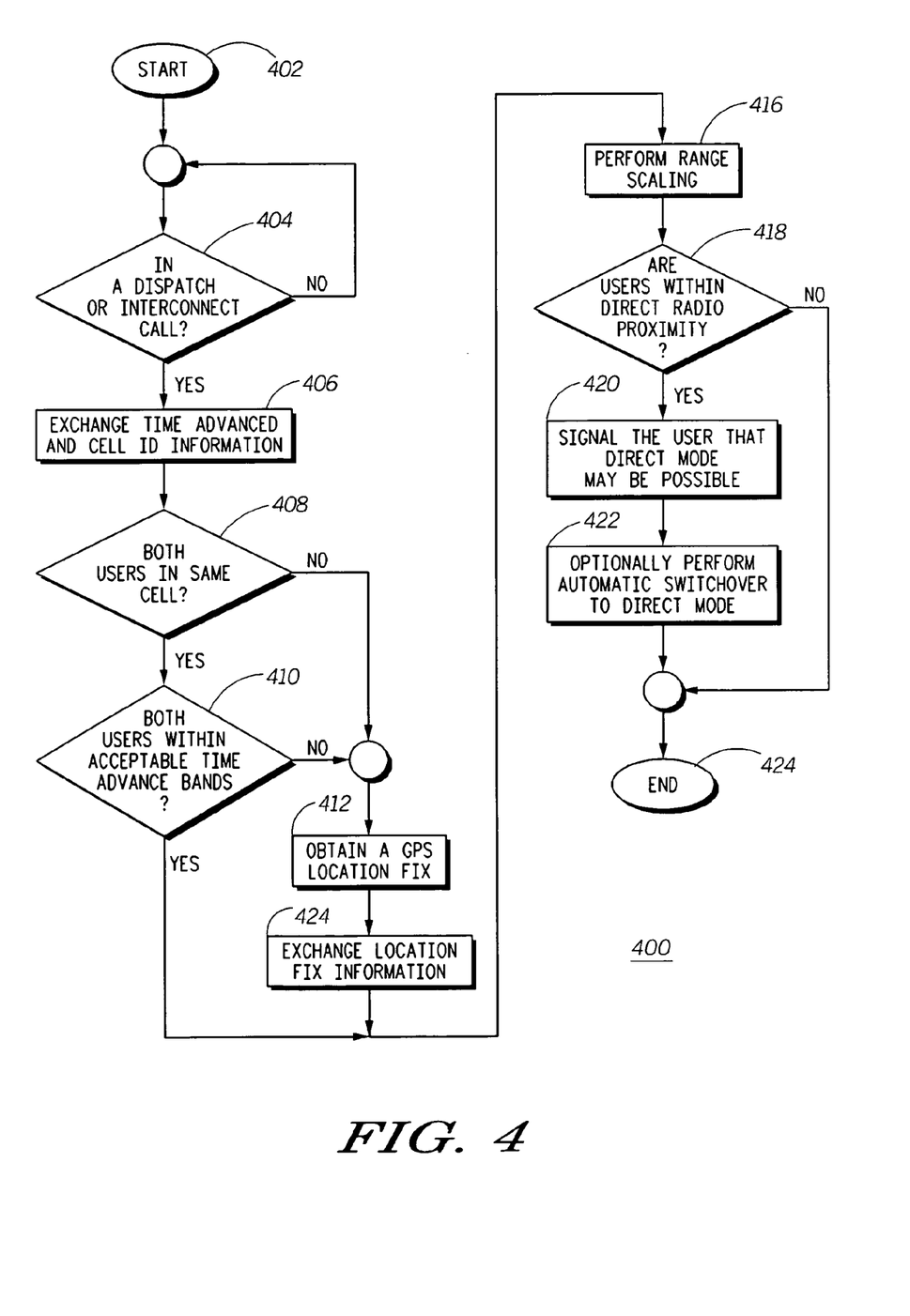
FIG. 4 shows a flow chart diagram of a method for changing a call from a network facilitated calling mode to a direct calling mode, in accordance with an embodiment of the invention.

Referring now to FIG. 4, there is shown a flow chart diagram 400 of a method for changing a call from a network facilitated calling mode to a direct calling mode, in accordance with an embodiment of the invention. At the start 402 of the method, the first and second mobile communication devices are powered up and registered for service with the communication system. Subsequently, a call is established between the mobile communication devices over the communication system using a first frequency band and wireless communication protocol. Once the call is on progress 404, the call may be switched to a direct mode of communication, and the switching may be initiated by the mobile communication devices or by the communication system. To determine if the call may be switched, if initiated at the mobile communication devices, the mobile communication devices may exchange time advance and cell identifier information, and may include both serving and neighbor cell identifiers 406. If the switching is initiated at the mobile communication devices, the mobile communication devices may exchange information by any number of data protocols, including embedding the information in the voice signal transmitted between the mobile communication devices, or by a separate packet data transmission, or by associated control protocol (ACP), for example. If the switch is initiated by the communication system, the communication system may compare the time advance and cell information of the mobile communication devices. If it appears that both mobile communication devices are in the same serving cell 408 and have similar timing settings 410, then the network assisted call in progress between the mobile communication devices is a candidate for switching to the direct mode of communication.

Alternatively, if the cell or timing information do not allow determination of the proximate location of the mobile communication devices, an alternative location comparison may be performed, such as by comparing the location of the mobile communication devices as determined by on-board satellite positioning receivers 412. The location may be initiated by the mobile communication devices, or the mobile communication devices may be prompted by the communication system to report their location to the communication system. The location may be determined by performing an autonomous location fix, or by using location aiding information received from the communication system at the mobile communication devices. Location aiding information may include, for example, approximate location, Doppler information for satellites presently in view, ephemeris data, and so on. When the mobile communication devices have determined their location, they may exchange their location information 414. At least one of the mobile communication devices must transmit its location to the other so that a comparison may be performed by the mobile communication device having the locations of both mobile communication devices. Alternatively, both mobile communication devices may report their location to the communication system.

Once the location information or the time advance and cell information has been acquired by the appropriate entities, either one or both of the mobile communication devices or the network equipment, the process of determining whether the mobile communication devices are within sufficient range for direct mode calling is commenced. In one embodiment of the invention the time advance information or satellite positioning location may be range scaled 416 to account for local geographic conditions. Range scaling takes into account the terrain in the vicinity of the mobile communication devices and the effect it may have on radio communication. After comparing the location information, or time advance and cell information, the equipment can determine if the mobile communication devices are within range of direct mode communications 418. Upon determining that the mobile communication devices are within sufficient proximity to commence direct mode communication, the mobile communication devices may alert the user to the favorable conditions 420, allowing the user the option to continue the communication by direct calling the other party's mobile communication device. Alternatively, the mobile communication device or the communication system may automatically switch the call to a direct mode call 422. If automatic switching is initiated by the communication system, control messages will be sent to both mobile communication devices, which may acknowledge the control message before the network assisted call is dropped by the communication system. Furthermore, the communication system may wait until the mobile communication devices acknowledge successful set up of a direct call before dropping the call. The method ends 424 upon successful switching of the call from a network assisted mode to a direct mode between the mobile communication devices.

Figure 5:
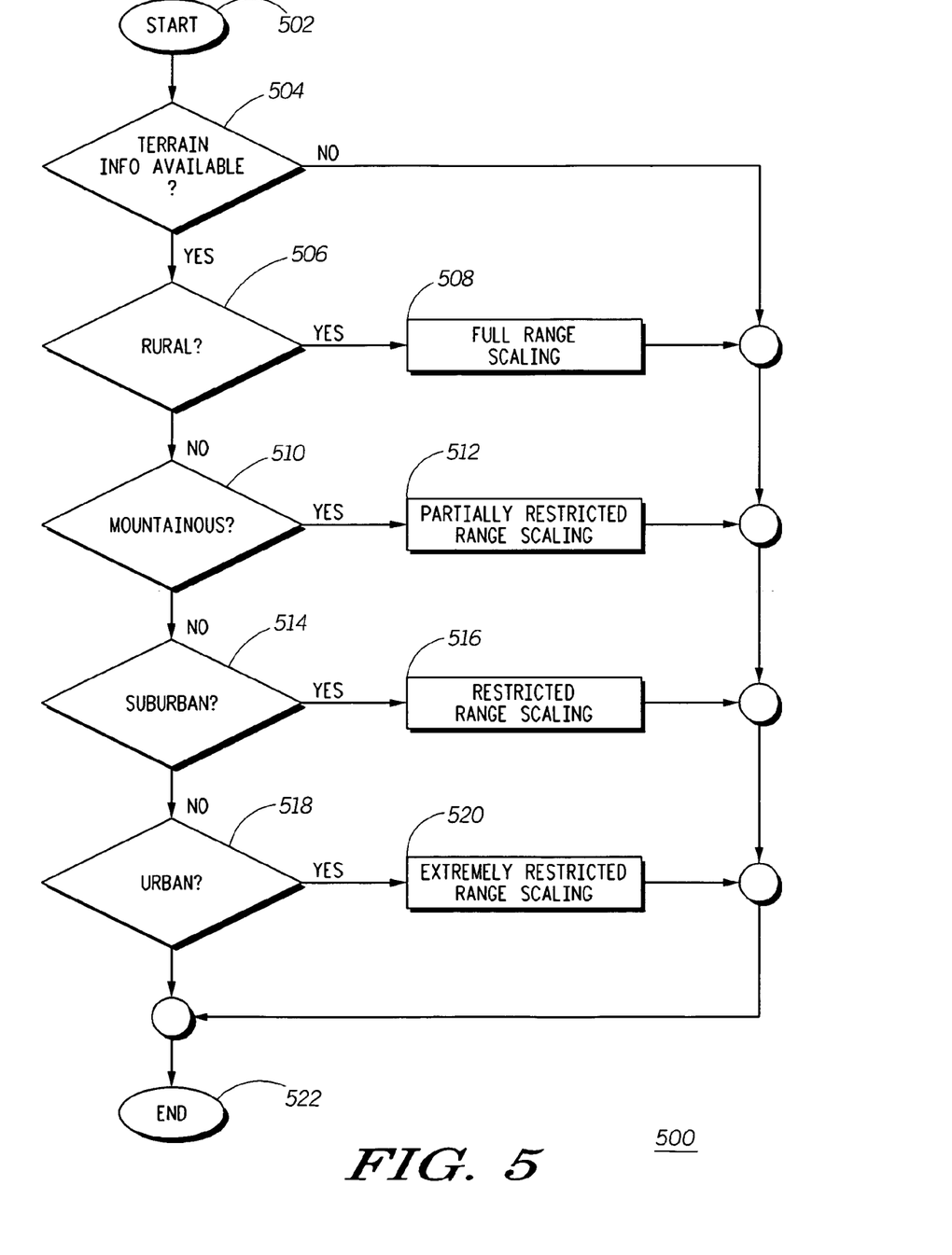
FIG. 5 shows a flow chart diagram of a process for performing range scaling of the location information regarding each mobile communication device which may be performed prior to determining if the mobile communication devices are in sufficient proximity to reliably support direct calling, in accordance with an embodiment of the invention.

FIG. 5 shows a flow chart diagram 500 of a process for performing range scaling of the location information regarding each mobile communication device which may be performed prior to determining if the mobile communication devices are in sufficient proximity to reliably support direct calling, in accordance with an embodiment of the invention. The scaling process may be performed, for example, as block 416 of FIG. 4. At the start 502 of the process, the bare location information has been acquired by the appropriate communication equipment, either one or both mobile communication devices, the communication system, or both the communication system and one or more of the mobile communication devices. The location information may include the time advance information and cell identifier, or the satellite positioning system location. First the terrain information must be available 504. The terrain information generalizes the terrain in the vicinity of the serving cell(s) in which the mobile communication devices are located. In one exemplary embodiment the terrain information may be simply reduced to a number broadcast by the serving base station in a broadcast control channel, for example. The number broadcast by the serving base station may be used by mobile communication devices in scaling the location information. In another exemplary embodiment, the mobile communication device may prompt the user of the device to select a terrain type from a menu presented to the user, and the resulting input may be used to scale location information. In another exemplary embodiment, the communication system may maintain a server with terrain information for each cell in the system, and a mobile communication device would access and query the server for the terrain information relating to the cell identifier of the serving cell or cells. In another exemplary embodiment the communication system makes the determination, and so the terrain information is not transmitted to the mobile communication devices, but maintained on a database within, and accessed by the communication system for scaling location information.

Once the terrain information has been acquired by the equipment making the determination as to whether the mobile communication devices may switch to direct mode communication, the location information may be scaled as indicated by the following examples. If the terrain type is, for example, rural 506, the location information may be unaffected 508. If the terrain is, for example, mountainous 510, the location information may be partially scaled, meaning the mobile communication devices must be closer than in rural terrain for direct mode communication. If the terrain is, for example, suburban 514, than further scaling is used 516, requiring the mobile communication devices to be closer than in mountainous terrain. If, for example, the terrain is urban 518, then the most restrictive scaling 520 is used. In another exemplary embodiment, terrain in the vicinity of the serving cell or cells may simply receive a percentage score, determined in whatever manner deemed appropriate by the communication service operator, that is used to scale the location information. The scaling is performed to take into account the signal behavior in the terrain in vicinity of the mobile communication devices. The scaling may take into account not just the topography, but the radio environment in the local vicinity as well. In terrain such as farmlands, signals have a much farther line of sight distance than in, for example, cluttered urban environments where buildings and other radio signals reduce the effective distance at which mobile communication devices can communicate directly. Once the scaling is performed, if used, the process ends 522 and the rest of method shown in FIG. 4 commences.

Figure 6:
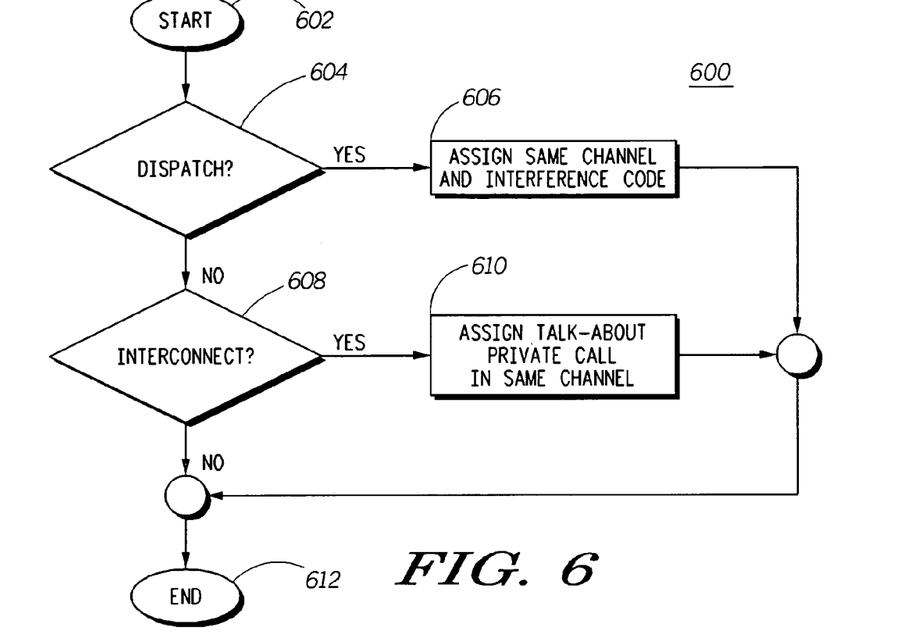
FIG. 6 shows a flow chart diagram of switching a call in a network assisted mode to a direct communication mode, in accordance with an embodiment of the invention.

Referring now to FIG. 6, there is shown a flow chart diagram of switching a call in a network assisted mode to a direct communication mode, in accordance with an embodiment of the invention. Because multiple pairs of mobile communication devices may be switched off the network to direct communication mode, in one embodiment of the invention collisions in the direct communication mode with other mobile communication device pairs already using the direct communication mode may be avoided by choosing channel parameters for the direct communication mode that are related to channel parameters used while communicating via the network assisted mode. For example, when a mobile communication device initiates a call via the communication system, it is assigned to a particular traffic channel. Furthermore, the mobile communication device may be using a particular sector of a serving cell. At the start 602, the mobile communication devices are communicating via the network, but are in the process of switching to direct mode communication. To select a mutually known channel for the direct communication mode for this particular embodiment of the invention, first it is determined if the mobile communication devices are engaged in a dispatch call 604. If the mobile communication devices are presently engaged in a network assisted dispatch call, the direct communication mode channel number may be selected as a multiple of the present channel number assigned to one of the mobile communication devices 606. Furthermore, in direct communication operation, an interference code may be used so that mobile communication devices operating in direct communication mode may ignore signals intended for other mobile communication devices that may happen to have been transmitted on a frequency to which the mobile communication device is presently tuned. Similarly, if the mobile communication devices are presently engaged in an interconnect or telephony call 608, meaning a full duplex call, the same channel number may be used 610. The process terminates 612 once appropriate channel parameters are know by each mobile communication device involved before switching to the direct communication mode. It is contemplated that the channel parameters may be selected by the initiating mobile communication device, and communicated to the second mobile communication device, or the channel parameters may be selected by the system and communicated to the mobile communication devices prior to switching communication modes. Alternatively, the mobile communication devices may, for example, first attempt to establish a call using conventional contention protocol of the direct communication mode before relinquishing the network assisted call.

Figure 7:
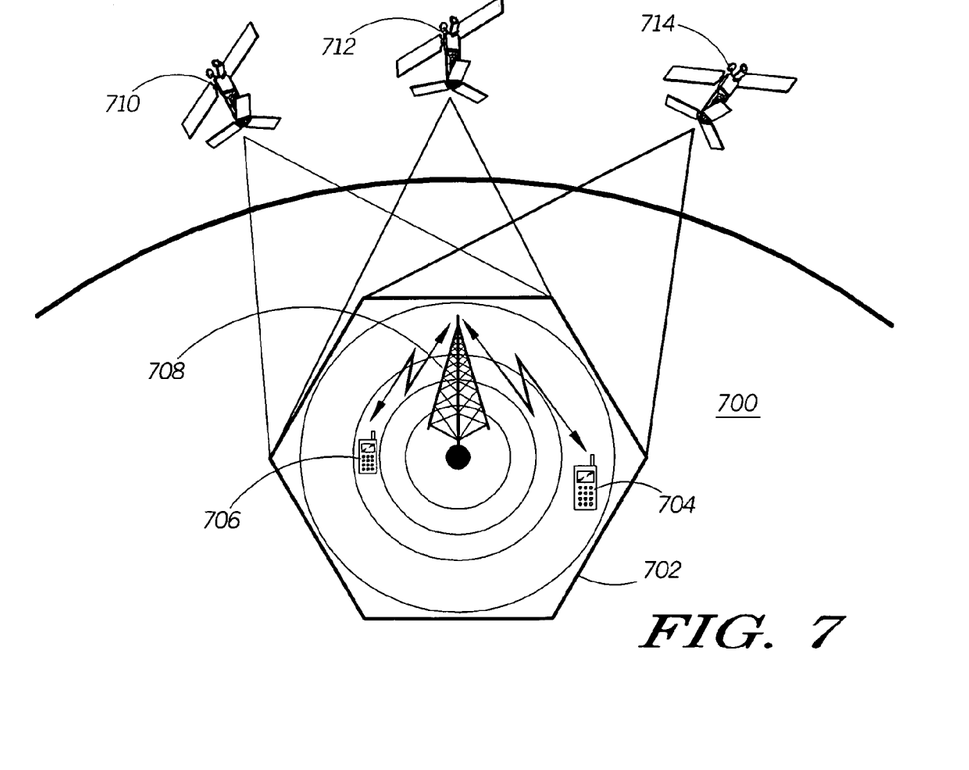
FIG. 7 shows a system diagram of a wireless communication for facilitating location determination by mobile communication devices via a satellite positioning system, in accordance with an embodiment of the invention.

Referring now to FIG. 7, there is shown a system diagram 700 of a wireless communication for facilitating location determination by mobile communication devices via a satellite positioning system, in accordance with an embodiment of the invention. A serving cell 702 provides network assisted communication service for mobile communication devices 704, 706. Access to the communication network is provided by a base station 708. The mobile communication devices may communicate with each other, or separately with other parties via the base station and communication network, as is known. It is contemplated that time advance information may result in situations where the mobile communication devices have a similar time advance index, but are on opposite sides of the serving cell, and are therefore out of range for direct communication, particularly in large, rural serving cells. Conversely, mobile communication devices may have different time advance parameters, but be located in line on the same side of a serving cell. Therefore, it is contemplated that satellite positioning may be used to more accurately determine mobile communication device location. To perform a satellite positioning location determination, a plurality of global positioning satellites 710, 712, 714 are provided in orbit. Each satellite transmits a signal according to a known protocol for use in determining the mobile communication device's latitude, longitude, and altitude, although altitude may be approximated. In commencing the location fix using the satellite signals, an mobile communication device having an on-board satellite positioning receiver or operably connected to a satellite positioning receiver may perform an autonomous fix, or an assisted fix. An autonomous fix refers to the positioning receiver having no information regarding approximate location, for example, and takes considerably longer to resolve the position of the satellite positioning receiver. An assisted fix includes receiving information from the communication network that assists in determining the satellite positioning receiver's position, such as, for example, approximate location such as the location of the serving cell base station tower, Doppler information, ephemeris information, and so on. On the location is determined, it may easily be tracked by the satellite positioning receiver, and can e reported by the mobile communication device to the other mobile communication device or the communication network.

Figure 8:
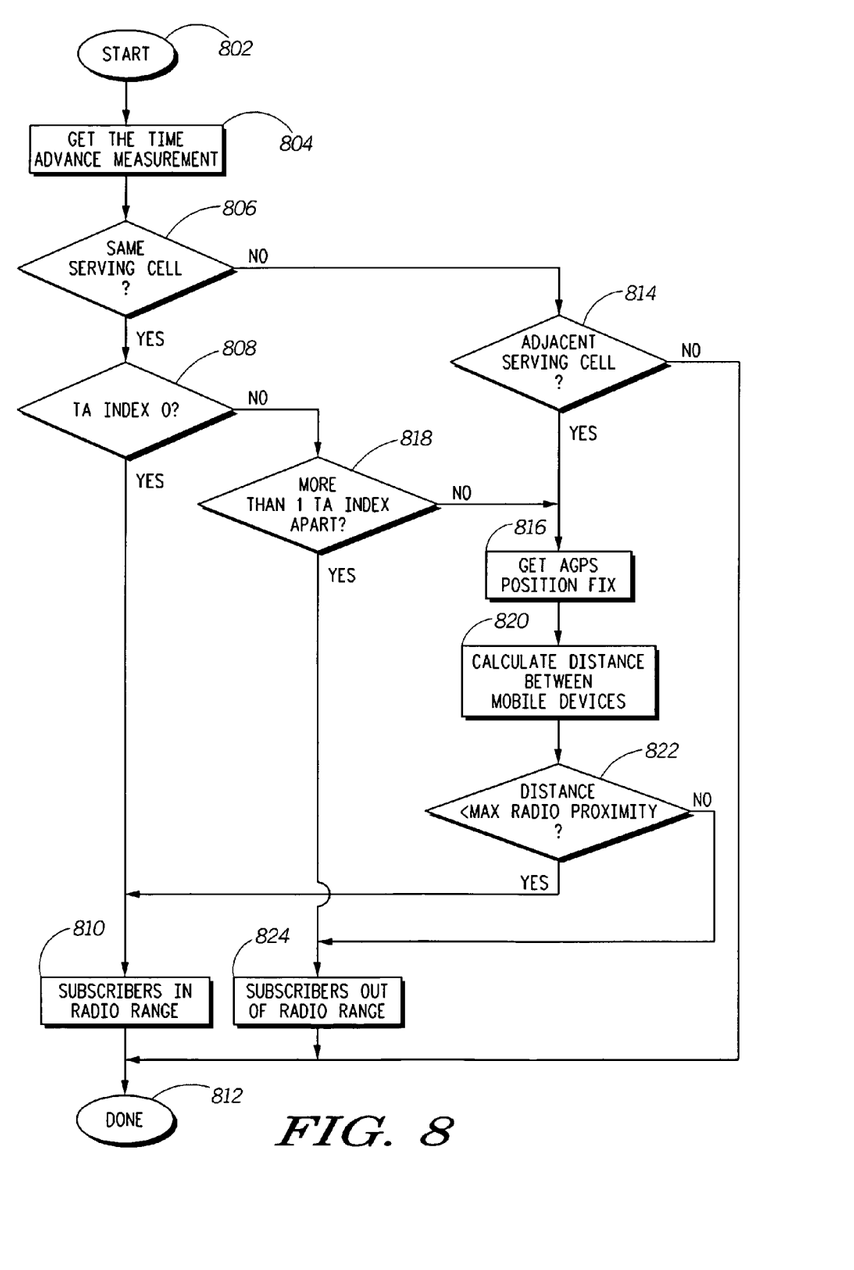
FIG. 8 shows a flow chart diagram of a process for determining if two mobile communication devices engaged in a network assisted call are candidates to switch to a direct communication mode, in accordance with an embodiment of the invention.

Referring now to FIG. 8, there is shown a flow chart diagram 800 of a process for determining if two mobile communication devices engaged in a network assisted call are candidates to switch to a direct communication mode, in accordance with an embodiment of the invention. At the start 802 of the process, the mobile communication devices have established a call between them via a communications network, using a first wireless communications protocol in a first communications frequency band. In making the determination whether the two mobile communication devices are within sufficient physical proximity to be switched to direct communications, some equipment must compare information relating to the location of each mobile communication device. That equipment may be one of the mobile communication devices, or it may be located in the communication system. Furthermore, it is contemplated that the process of determining the physical proximity of the mobile communication devices may be performed upon a first mobile communication device initiating a call to the second mobile communication device, before a network assisted call is established between the mobile communication devices so that they may initiate the call using the direct communication mode so as to avoid setting up a network call circuit.

To determine if the mobile communication devices are within sufficient radio proximity to support direct communication, the time advance and cell information may be acquired by the deciding equipment 804. If the initiating mobile communication device is the deciding equipment, then it must acquire the time advance information of the mobile communication device being called. If the communication system contains the deciding equipment, then it must have the time advance information of each mobile communication device. This may be acquired by querying the mobile communication devices, or by querying the base station, for example. The deciding equipment then determines if the mobile communication devices are within the same serving cell 806, such as by comparing the cell identifier to which each mobile communication device is presently affiliated. If the mobile communication devices are within the same cell, then the timing index presently used by each mobile communication device may be compared. If both mobile communication devices have a timing index of 0 808, meaning they are both very close to the serving cell base station, then they are within sufficient radio range for direct communication 810, and the process terminates 812 and the method continues.

If the mobile communication devices are not in the same serving cell 806, then their cell information is compared to determine if they are in adjacent cells 814. If they are not in adjacent cells, then they are not within sufficient radio range to support direct communication, and the process terminates. If they are in adjacent cells, then they may be within sufficient radio range, and an alternative location determination must be made, such as, for example, acquiring the satellite positioning location of each mobile communication device 816. This alternative location information may also be used when, upon initially comparing the time advance information of mobile communication devices in the same cell 808, it is found they have a time index difference of 1 818. Once the satellite positioning locations are determined, the distance between them may be calculated 820, and compared to a known maximum distance value 822. If the distance between the mobile communication devices is within the maximum distance, then the mobile communication devices are within range 810, and otherwise they are out of range 824. Similarly, if the time advance information indicates the mobile communication devices are more than 1 time advance index apart 818, then it may be decided that the mobile communication devices are out of range to support direct communication.

Therefore the invention provides a method for changing a call from a network facilitated calling mode to a direct calling mode. In one embodiment of the invention the method begins by establishing a call between a first mobile communication device and a second mobile communication device via a communications network, where the first and second mobile communication devices communicate with the communications network using a first wireless communications protocol in a first communications frequency band. Subsequently, the method commences by determining that the first and second mobile communication devices are within sufficient radio proximity to allow the direct calling mode to commence. By radio proximity it is meant that the mobile communication devices are within a physical proximity in the given terrain and radio environment for signals to be transmitted a received reliably between the mobile communication devices. If the mobile communication devices are within sufficient radio proximity, the method includes commencing the call using the direct communication mode where the first and second mobile communication devices communicate directly with each other using a second wireless communications protocol in a second communications frequency band. Upon successfully switching to the direct communication mode, the mobile communication devices and communication system relinquish the communication resources of the communication system used in network assisted call. The method may include a process for determining that the first and second mobile communication devices are within sufficient radio proximity which is performed by the communications network, or by one of the mobile communication devices. The method may be performed automatically by the communication system, and result in the communication system forcing the mobile communication devices to use the direct communication mode, or it may be initiated by the users of the mobile communication devices. The process of determining if the mobile communication devices are within direct radio range of each other may be performed by comparing a timing advance index number of the first mobile communication device with a timing advance index number of the second mobile communication device when the first and second mobile communication devices are within the same communication cell. To account for the effect of terrain on radio proximity, determining that the first and second mobile communication devices are within sufficient radio proximity may include applying a scaling factor corresponding to a terrain type associated with the communication cell. In one embodiment of the invention, the method includes sending a message from the communications network to the first and second mobile communication devices to initiate the direct communication mode. For example, the message or command to switch to direct communication may be performed by ACP messaging. In one embodiment of the invention, the first and second mobile communication devices are part of a talk group, and the call that is switched is a talk group call including additional mobile communication devices. If the mobile communication devices are in different cells, the method may include determining that the first and second mobile communication devices are in different communication cells, and then requesting location information from each of the first and second mobile communication devices, performed by the communication network. The location information is acquired at each of the first and second mobile communication devices by use of a satellite positioning receiver disposed in the mobile communication devices. The communication system receives the location information from each of the first and second mobile communication devices, and compares the locations of each of the mobile communication devices to see if they are within radio proximity. It is also contemplated that one of the mobile communication devices may request the location of the other mobile communication device, and determine if they are within sufficient radio proximity.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for changing a call from a network facilitated calling mode to a direct calling mode, comprising:
   establishing a call between a first mobile communication device and a second mobile communication device via a communications network, the first and second mobile communication devices communicating with the communications network using a first wireless communications protocol in a first communications frequency band;
   determining that the first and second mobile communication devices are within sufficient radio proximity to allow the direct calling mode to commence; and
   commencing the call using the direct communication mode where the first and second mobile communication devices communicate directly with each other using a second wireless communications protocol in a second communications frequency band;
   wherein determining that the first and second mobile communication devices are within sufficient radio proximity is performed by the communications network comparing a timing advance index number of the first mobile communication device with a timing advance index number of the second mobile communication device when the first and second mobile communication devices are within the same communication cell.

2. A method for changing a call from a network facilitated calling mode to a direct calling mode as defined in claim 1, wherein determining that the first and second mobile communication devices are within sufficient radio proximity comprises applying a scaling factor corresponding to a terrain type associated with the communication cell.

3. A method for changing a call from a network facilitated calling mode to a direct calling mode as defined in claim 1, wherein the first and second mobile communication devices are part of a talk group, and the call is a talk group call including additional mobile communication devices.

4. A method for changing a call from a network facilitated calling mode to a direct calling mode as defined in claim 1, wherein determining that the first and second mobile communication devices are within sufficient radio proximity comprises:
   determining that the first and second mobile communication devices are in different communication cells;
   requesting location information from each of the first and second mobile communication devices, performed by the communication network, the location information being acquired at each of the first and second mobile communication devices by use of a satellite positioning receiver disposed in each of the first and second mobile communication devices; and
   receiving the location information from each of the first and second mobile communication devices; and
   comparing the location information received from each of the first and second mobile communication devices.

5. A method for changing a call from a network facilitated calling mode to a direct calling mode as defined in claim 1, wherein determining that the first and second mobile communication devices are within sufficient radio proximity to allow the direct calling mode to commence is performed by one of the first and second mobile communication devices.

6. A method for changing a call from a network facilitated calling mode to a direct calling mode as defined in claim 1, wherein commencing the call using the direct communication mode comprises selecting a channel parameter of the direct communication mode based on a channel parameter of the network assisted communication mode.

7. A method for changing a call from a network facilitated calling mode to a direct calling mode as defined in claim 1, wherein commencing the call using the direct communication mode comprises sending a message from the communications network to the first and second mobile communication devices to initiate the direct communication mode.

8. A method for changing a call from a network facilitated calling mode to a direct calling mode as defined in claim 7, wherein the sending the message is performed by associated control protocol messaging.

9. A method for initiating a direct communication mode between a first mobile communication device and a second mobile communication device in a wireless communication system, comprising:
   registering the first and second mobile communication devices for communication service with the wireless communication system;
   initiating a network-assisted call from the first mobile communication device to the second mobile communication device via the wireless communication system;
   determining that the first and second mobile communication devices are within sufficient radio proximity to support a direct communication mode, performed by the wireless communication system comparing a timing advance index number of the first mobile communication device with a timing advance index number of the second mobile communication device when the first and second mobile communication devices are within the same communication cell;
   switching to a direct communication mode at both the first and second mobile communication devices; and
   continuing communications between the first and second mobile communication devices using the direct communication mode.

10. A method for initiating a direct communication mode as defined in claim 9, wherein the network-assisted call is performed in a first frequency band according to a first wireless communication protocol, and the direct communication mode is performed in a second frequency band in accordance with a second wireless communication protocol.

11. A method for initiating a direct communication mode as defined in claim 9, wherein determining that the first and second mobile communication devices are within sufficient radio proximity to support a direct communication mode is performed by one of the first and second mobile communication devices.

12. A method for initiating a direct communication mode as defined in claim 9, wherein determining that the first and second mobile communication devices are within sufficient radio proximity to support a direct communication mode is performed by the communication system.

13. A method for initiating a direct communication mode as defined in claim 9, further comprising, subsequent to initiating the network assisted call and prior to switching to the direct communication mode, establishing a network assisted call circuit between the first and second mobile communication devices in the communication system.

* * * * *